United States Patent
Cacace

(10) Patent No.: US 10,668,695 B2
(45) Date of Patent: Jun. 2, 2020

(54) METHODS FOR THE PRODUCTION OF CLAD STEEL PRODUCTS

(71) Applicants: CLADINOX INTERNATIONAL LIMITED, Victoria (SC); Antonio Giorgio Cacace, Swansea (GB)

(72) Inventor: Antonio Giorgio Cacace, Swansea (GB)

(73) Assignee: CLADINOX INTERNATIONAL LIMITED, Victoria, Mahe (SC)

( * ) Notice: Subject to any disclaimer, the term of this patent is extended or adjusted under 35 U.S.C. 154(b) by 438 days.

(21) Appl. No.: 15/305,928

(22) PCT Filed: May 7, 2015

(86) PCT No.: PCT/GB2015/051335
§ 371 (c)(1),
(2) Date: Oct. 21, 2016

(87) PCT Pub. No.: WO2015/170101
PCT Pub. Date: Nov. 12, 2015

(65) Prior Publication Data
US 2017/0050414 A1    Feb. 23, 2017

(30) Foreign Application Priority Data

May 9, 2014    (NZ) ........................................ 624760

(51) Int. Cl.
*B32B 15/01*    (2006.01)
*B21D 39/04*    (2006.01)
(Continued)

(52) U.S. Cl.
CPC ............ *B32B 15/011* (2013.01); *B21D 39/04* (2013.01); *B23K 31/02* (2013.01); *B32B 3/10* (2013.01);
(Continued)

(58) Field of Classification Search
CPC ....... B21D 39/04; B32B 15/01; B32B 15/011; B32B 15/013; B32B 15/012;
(Continued)

(56) References Cited

U.S. PATENT DOCUMENTS

| 3,574,569 A | 4/1971 | Vordahl |
| 5,051,315 A | 9/1991 | Cacace |

(Continued)

FOREIGN PATENT DOCUMENTS

| DE | 12 06 285 B | 12/1965 |
| WO | 2011/048364 A1 | 4/2011 |
| WO | 2012/143668 A1 | 10/2012 |

OTHER PUBLICATIONS

International Search Report, dated Oct. 30, 2015, from corresponding PCT application.

*Primary Examiner* — Michael E. La Villa
(74) *Attorney, Agent, or Firm* — Young & Thompson

(57) ABSTRACT

Billets and methods for manufacturing them are disclosed. The billets include a cladding member including an alloy selected from the group including stainless steel, nickel-chrome, nickel-copper, and copper-nickel alloys, and a steel body that is positioned so that it has an interface with the cladding member, the steel body having a formation in which the scavenging metal is located and elements being provided for separating the scavenging metal from the cladding member at the interface.

17 Claims, 10 Drawing Sheets

(51) Int. Cl.
  *B23K 31/02* (2006.01)
  *C21D 8/04* (2006.01)
  *C21D 1/68* (2006.01)
  *C21D 8/02* (2006.01)
  *C21D 9/00* (2006.01)
  *B32B 3/14* (2006.01)
  *B32B 3/18* (2006.01)
  *B32B 15/04* (2006.01)
  *B32B 3/20* (2006.01)
  *B32B 15/18* (2006.01)
  *B32B 3/10* (2006.01)
  *B23K 101/34* (2006.01)
  *B23K 103/04* (2006.01)
  *C21D 1/70* (2006.01)

(52) U.S. Cl.
  CPC .............. *B32B 3/14* (2013.01); *B32B 3/18* (2013.01); *B32B 3/20* (2013.01); *B32B 15/01* (2013.01); *B32B 15/012* (2013.01); *B32B 15/013* (2013.01); *B32B 15/015* (2013.01); *B32B 15/04* (2013.01); *B32B 15/043* (2013.01); *B32B 15/18* (2013.01); *C21D 1/68* (2013.01); *C21D 8/021* (2013.01); *C21D 8/041* (2013.01); *C21D 9/0081* (2013.01); *B23K 2101/34* (2018.08); *B23K 2103/05* (2018.08); *C21D 1/70* (2013.01); *C21D 2251/02* (2013.01); *Y10T 428/12222* (2015.01); *Y10T 428/12229* (2015.01); *Y10T 428/12236* (2015.01); *Y10T 428/12264* (2015.01); *Y10T 428/12278* (2015.01); *Y10T 428/12285* (2015.01); *Y10T 428/12319* (2015.01); *Y10T 428/12451* (2015.01); *Y10T 428/12486* (2015.01); *Y10T 428/12854* (2015.01); *Y10T 428/12917* (2015.01); *Y10T 428/12924* (2015.01); *Y10T 428/12931* (2015.01); *Y10T 428/12937* (2015.01); *Y10T 428/12944* (2015.01); *Y10T 428/12951* (2015.01); *Y10T 428/12958* (2015.01); *Y10T 428/12965* (2015.01); *Y10T 428/12972* (2015.01); *Y10T 428/12979* (2015.01)

(58) Field of Classification Search
  CPC ..... B32B 15/015; B32B 15/04; B32B 15/043; B32B 15/18; B32B 3/10; B32B 3/14; B32B 3/18; B32B 3/20; C21D 2251/02; C21D 8/021; C21D 9/0081; C21D 1/68; C21D 1/70; C21D 8/043; C21D 8/041; B23K 2103/05; B23K 31/02; B23K 2101/34; Y10T 428/12451; Y10T 428/12486; Y10T 428/12854; Y10T 428/12917; Y10T 428/12924; Y10T 428/12931; Y10T 428/12937; Y10T 428/12944; Y10T 428/12951; Y10T 428/12958; Y10T 428/12965; Y10T 428/12972; Y10T 428/12979; Y10T 428/12229; Y10T 428/12236; Y10T 428/12264; Y10T 428/12222; Y10T 428/12285; Y10T 428/12278; Y10T 428/12319
  See application file for complete search history.

(56) References Cited

U.S. PATENT DOCUMENTS

| | | |
|---|---|---|
| 6,706,416 B1 | 3/2004 | Cacace |
| 2012/0202088 A1* | 8/2012 | Cacace .................. B32B 15/01 428/576 |
| 2014/0037979 A1* | 2/2014 | Cacace ................ B21C 33/004 428/577 |

* cited by examiner

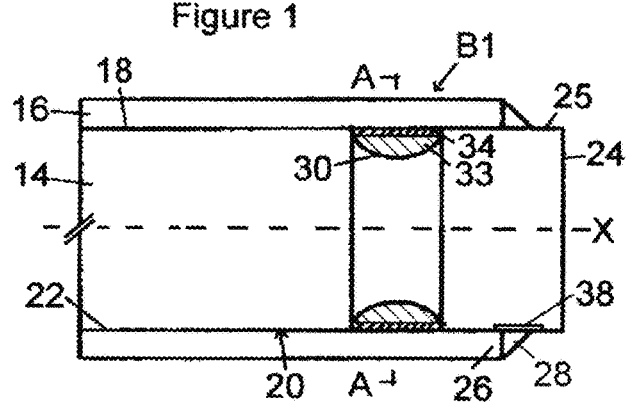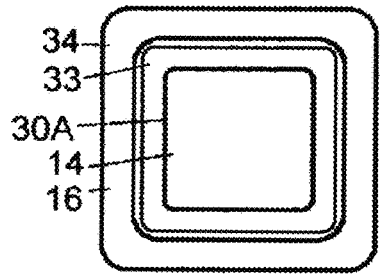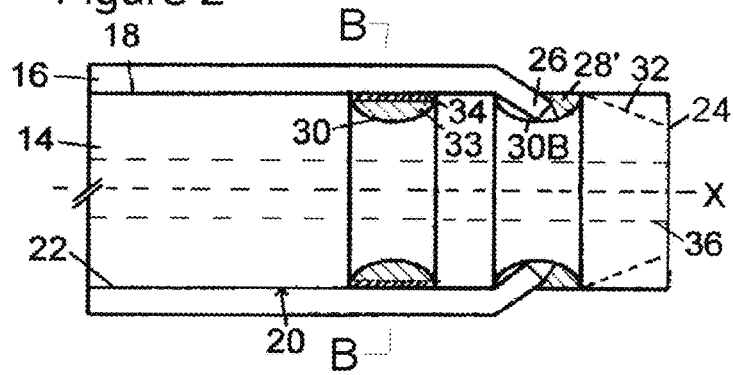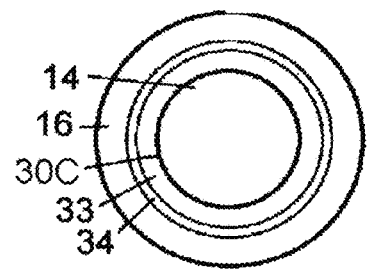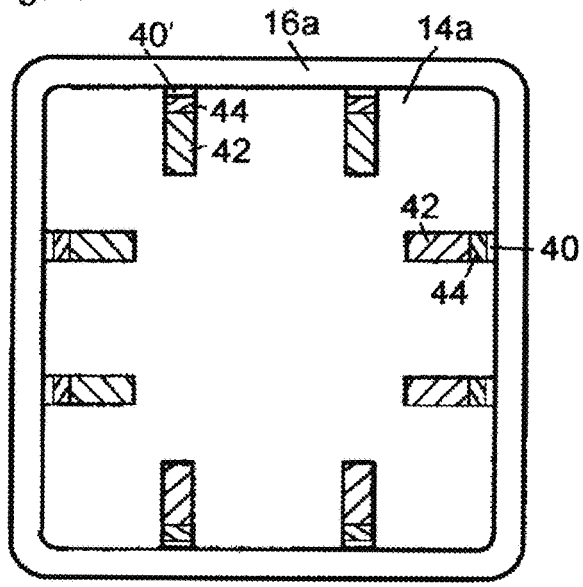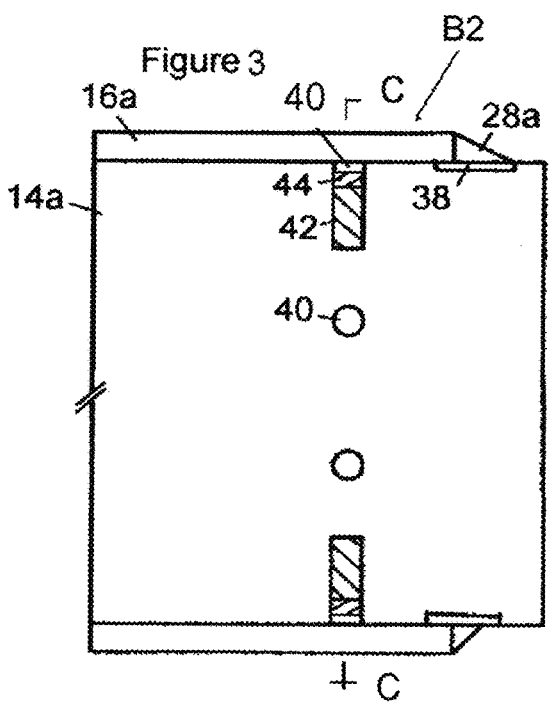

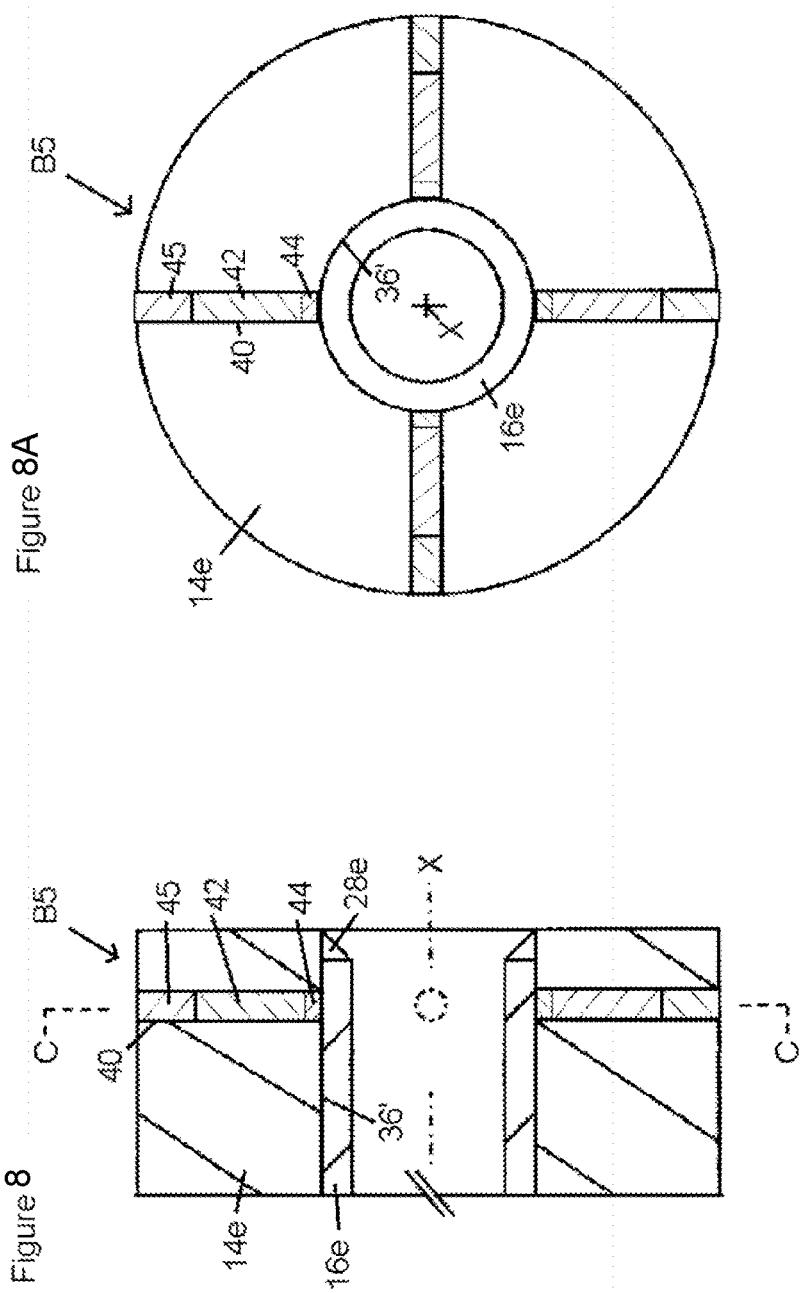

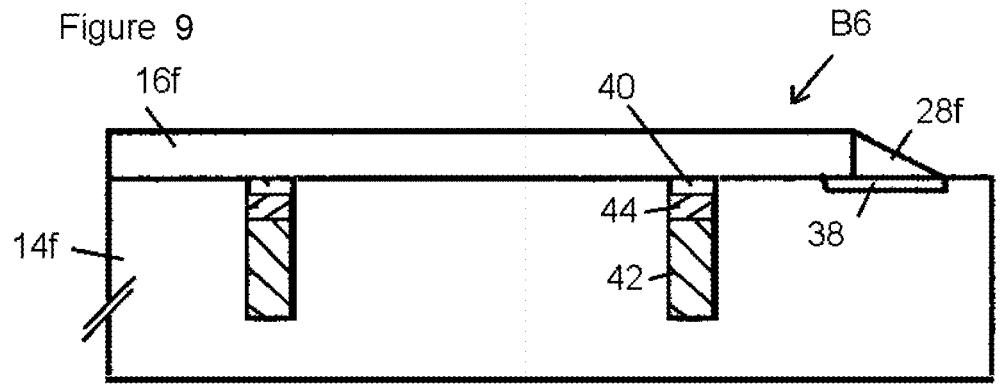
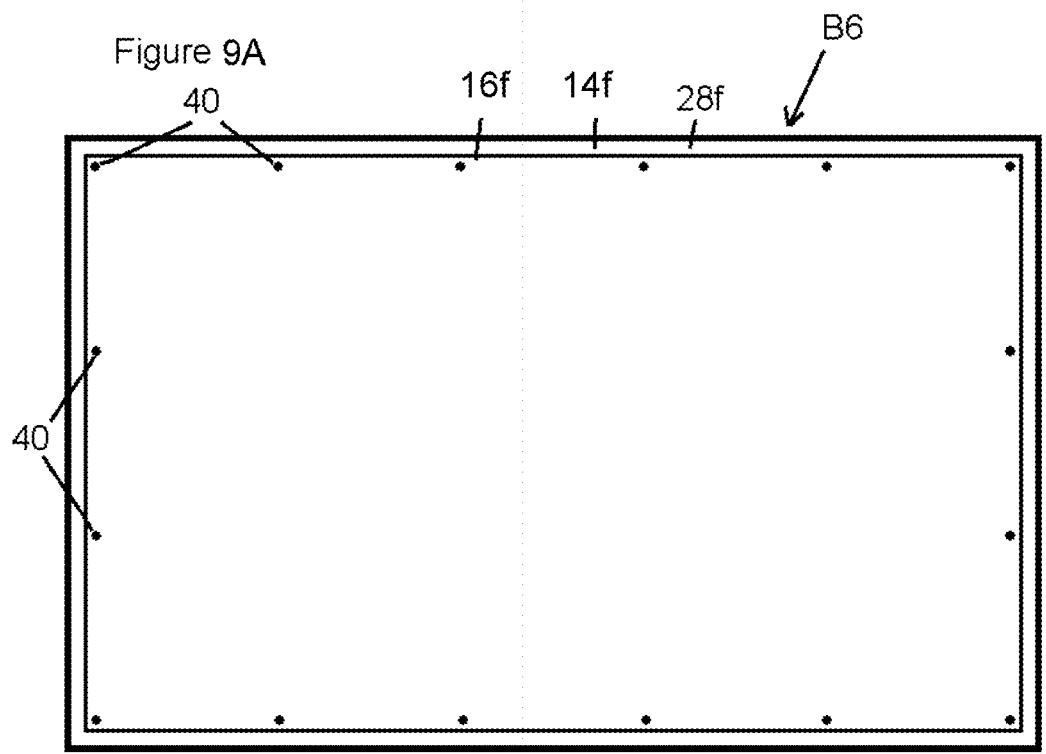

Figure 12
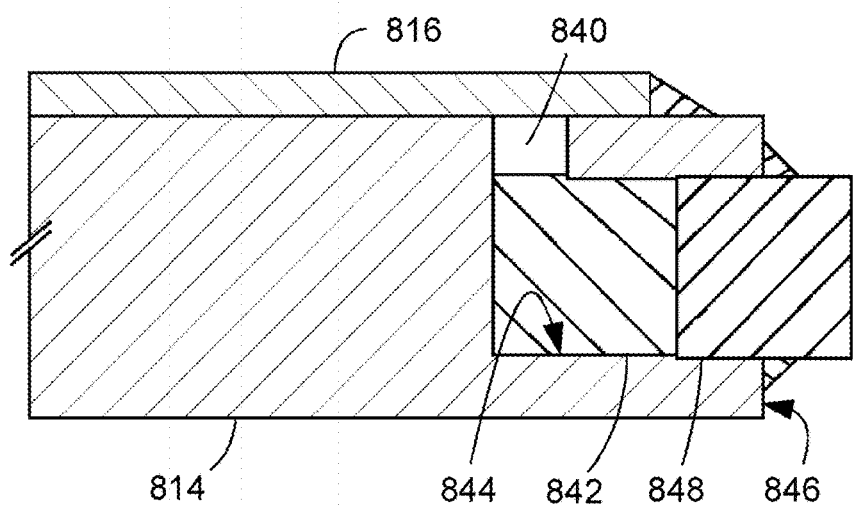
Figure 13
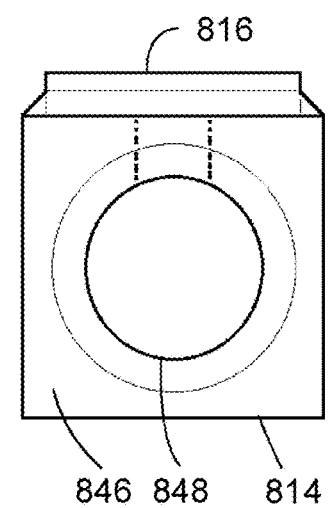
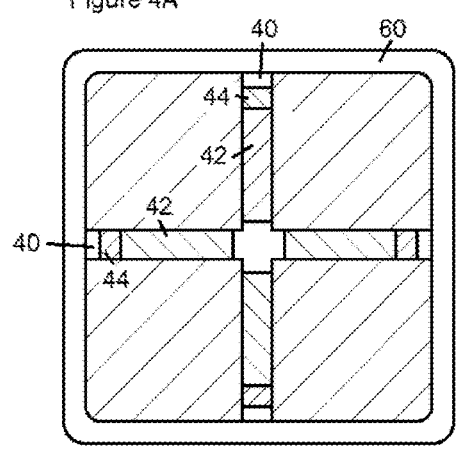

METHODS FOR THE PRODUCTION OF CLAD STEEL PRODUCTS

This invention relates to the production of corrosion-resistant metal products. The invention has particular but not exclusive application to products comprising a core of corrosion susceptible steel to which is applied a cladding comprised of stainless steel, nickel-chrome alloy, nickel-copper or copper-nickel alloy. It is intended that the invention should cover methods for preparing billets for producing such products and also the billets themselves since there may be a market for such billets.

The susceptibility to corrosion of what are commonly simply called "steels" that are most often used in industry is well known and should not require further discussion. Conversely, the corrosion resistant properties of stainless steels and the aforementioned alloys are equally well known. This invention applies, in principle, to any product that is composed of a body of steel that is significantly more susceptible to corrosion than stainless steel or the aforementioned alloys and that is susceptible of having applied to it a cladding of these materials by the techniques described herein. In this specification, the term "steel", used by itself, will refer to such a steel unless it is clear from the context that this is not intended. In particular, it is intended that the term "steel" should cover what are commonly called carbon steels. According to convention, and as used herein, the term "carbon steel" covers the various grades of thereof, including mild steels, low alloy engineering steels and micro-alloy steels.

The terms "stainless steel", "nickel-chrome alloy" and "nickel-copper alloy" are names that are well known in the metal industry and are generally applied to a range of alloys containing, respectively, significant amounts of chrome, nickel and chrome, and copper and nickel. In nickel-copper alloys there is more nickel than copper, in contrast to "copper-nickel alloys" in which the proportions of nickel and copper are reversed. Ranges of alloys under each of the four names appear in lists available from the major producers thereof. In this specification, the term "alloys contemplated herein" refers to any of these alloys, unless it is clear from the context that this is not intended. Stainless steel grade AISI A304L has been applied to the billets that have been used in trials to date. However, it should be possible to use any suitable grade of stainless steel, depending on what is needed for the end product produced from a billet.

There have been many earlier proposals to produce clad steel products of the type described above. The most relevant of these proposals are described in international patent applications no. WO2011/048364 and WO2012/143668, and in U.S. Pat. No. 6,706,416 and a number of earlier patents referred to therein, including U.S. Pat. No. 5,051,315. These earlier patents and patent applications are all to Cacace, the inventor named in the present application.

Examination of these earlier proposals shows that the achievement of a satisfactory metallurgical bond at the interface between the stainless steel cladding and the steel core has been problematical. The root of the problem is the occurrence of oxidation at elevated temperatures of the chrome in the stainless steel at the interface between the cladding and steel core.

The cores of the billets described in the US patents are made up of finely divided steel swarf. On the other hand, in the international patent applications, the cores are of solid steel. The present invention is also concerned with billets having solid steel cores.

In WO2011/048364, the core of the billets is referred to as a "body" of solid steel. Unless a contrary indication appears from the context, the terms "core" and "body" are used interchangeably throughout this specification to indicate a body that is typically but not essentially elongate and may be solid, tubular or otherwise hollow. Where the billet is intended for production of an end product that is externally clad around its entire periphery, placed in a tube (referred to herein as "the cladding tube") of stainless steel or one of the other alloys contemplated herein. The cross-sectional shape of the core and cladding tube is typically round or square. When the core is inserted in the cladding tube, there is an interface between the two at which they become bonded together when the billet is heated and rolled or otherwise worked into a ferrous product. In WO2011/048364, one or more elements, composed of scavenging metal, typically being finely divided aluminium, titanium or magnesium, are placed in the cladding tube adjacent each end of the core. The scavenging metal serves to scavenge oxygen and all other gases except inert gases from residual air at the interface to prevent oxidation of the chrome in the cladding tube at the interface. The cladding tube is typically sealed to prevent atmospheric gases or furnace gases outside the billet from penetrating to the interface. The ends of the billet are heated up to a temperature at which the scavenging metal becomes active before the interface reaches a temperature at which oxidation of the stainless steel starts on a significant scale. The scavenging metal can be placed directly in the cladding tube against the ends of the core or may be housed in steel cartridges placed against the ends of the core. In both cases, the ends of cladding tube are sealed by steel sealing plates that are welded in the ends of the tube.

This arrangement has been found to be satisfactory in the case of many billets, particularly round billets of smaller size. However, most modern rolling mills are designed to roll larger sized square billets. In the course of trials carried out in connection with the present application, when an in-line mill has been used to roll such larger billets, a number of issues have arisen.

In the first place, the ends of billets assembled in the manner described above exhibit a tendency to fail during rolling, commonly at the welds that hold the sealing plates in place, with consequent oxidation at the interface. In addition to such weld failure, it has been found during trials that the tube ends have a tendency to spread laterally in the early stages of rolling. This is known as "finning" or "fishtailing" and commonly results in the billet becoming bent or warped. This can lead to the billet becoming jammed in the mill guides, an occurrence known as "cobbling", preventing further rolling.

In the case of clad billets, both finning and fishtailing evidently arise from the fact that the ends of the cladding tube project clear of the ends of the core and derive insufficient support from the core against the forces that arise during rolling. WO2012/143668 discloses a method of preparing billets that, inter alia, addresses this issue. In this method, the projecting ends of the cladding tube are swaged inwardly to a transverse size that is smaller than that of the end of the core. This step has the advantage that the sealing welds are less vulnerable. Further, when rolling commences, the billet ends, being tapered, come into contact with the rolls only after the billet has passed through perhaps the initial two or three roll stands. At this stage, it is likely that the cladding tube will already have become sufficiently bonded to the core to significantly reduce the possibility of oxidation if the sealing welds fail. Furthermore, again because the tube ends are tapered, it is less likely that cobbling will occur due to finning or fishtailing before the nose and tail of the billet are cropped. In this regard, it should be explained that shears are incorporated in all rolling mills specifically to avoid cobbling. In conventional rolling mill practice, cobbling is most likely to occur after the heaviest reductions and, in in-line rolling mills, the shears are therefore generally positioned after the first six or seven roughing passes or stands.

The improvements disclosed in WO2012/143668 have ameliorated these problems. However, during subsequent trials on large square billets rolled in an in-line mill, it has been found that some failure has continued. In these cases, the ends of some billets were found to have already broken open when exiting from the furnace, i.e. even prior to entering the first roll stand.

The scavenging metal that was used in these billets was either finely divided titanium or aluminium. Aluminium melts at 650° C. In the billets in which aluminium was used, it has been found after painstaking investigation that, at the temperature of around 1200° C. (the temperature at which the billet leaves the furnace), together with the longer soaking times associated with larger billets, aluminium became extremely reactive despite being in a vacuum at this stage. As a result, it is now believed that the aluminium attacked both the steel and stainless steel, thereby perforating thinner walled cladding tubes.

On the other hand, titanium ignites in air at a temperature of about 600° C. and burns with a "thermite" type reaction, reaching a temperature of about 3000° C. In the billets in which titanium was used, the failure of the billet ends was initially put down to the ignition of the titanium in the presence of an excess of oxygen which perhaps penetrated through pin holes or cracks in the sealing welds.

It should be stressed that these problems had not occurred during trials on small, round billets.

Further investigation now suggests two possible causes of the failure of the ends of the cladding tubes that is still occurring during rolling. In the first place, it appears that, when titanium in contact with the stainless steel cladding tube is heated, there is a metallurgical reaction between the two that causes the titanium to attack and corrode away the cladding tube, even in a vacuum. The problem is exacerbated by the long dwell or soaking times of up to 4 hours and ambient temperatures of 900-1200° C. associated with larger billets. It has been found moreover that steel is evidently not attacked by the titanium in the same way as is stainless steel. It appears that this reaction is not well known or understood. It seems likely that the same reaction can be expected when aluminium is used instead of titanium.

Second, the applicant has now also become aware that when clad billets are rolled in an in-line rolling mill, in contrast to a reversing or cross-country mill, there is a tendency for the tail end of the steel core to extrude outwards in the axial direction relative to the end portion of the cladding tube. The centre portion of the core undergoes a greater degree of such extrusion than the periphery so that the end face of the core becomes convex in the process. As this happens, the end of the core pushes against any scavenging metal present at the tail end of the core and this in turn pushes forcefully against any sealing plate or against the portions of the cladding tube that have been folded over the end of the core and welded together to seal the billet. This force can cause the folded over portions of the tube to be torn off or the welds to fail. The greater the reduction through each stand, the more pronounced the convexity will be, and therefore the force exerted by the core.

It has been found that the tail ends of billets that are rolled in an in-line mill break up more frequently than the leading ends. Although cobbling rarely occurs from tail ends deformed by finning or fishtailing, exiting from the rolls, the tail end can dislodge or knock out of axial alignment, rolling mill "tackle" such as entry and exit guides. This leads to more frequent interruptions in production.

Conversely, the end face of the leading end or "nose" of the core is drawn concavely inwards. The end face is thus drawn away in the axial direction from the briquette as well as away from the sealing member at the leading end of the billet. The now hollow cladding tube lacks the support of the core at the leading end, and can thus cause the cladding tube to fin, break up or cobble before it can be cropped off by the flying shear.

WO2012/143668 shows a technique of counteracting this void formation at the nose by anchoring annular briquettes to a shaft protruding axially from the centre of the end face of the core. This technique has had limited success resulted due to the considerable tensile forces exerted on the shaft at the nose end of the billet as the end face became concave, leading to shaft failure. The technique also proved inadequate to some extent at the tail end of the billet, with the shaft becoming elongated relative to the periphery of the core, causing the briquettes to become increasingly separated from the face of the core as the convexity of the tail end increased.

Since the scavenging metal in these billets is in contact with the cladding tube at both ends of the billet, these problems may have been exacerbated by the fact that the cladding tube may already have been in a weakened state due to the metallurgical reaction already mentioned.

This difference in behaviour between the leading and tailing ends of a billet rolled in an in-line mill is unexpected having regard to the applicant's experience with cross country mills.

It is an aim of the present invention to address these issues.

To this end, from a first aspect, this invention provides a billet including a cladding member comprised of an alloy selected from the group comprising stainless steel, nickel-chrome, nickel-copper and copper-nickel alloys, and a steel body that is positioned so that it has an interface with the cladding member, the steel body having a formation in which the scavenging metal is located and means being provided for separating the scavenging metal from the cladding member at the interface.

From a second aspect, this invention provides a method of forming a billet comprising a cladding member comprised of an alloy selected from the group comprising stainless steel, nickel-chrome, nickel-copper and copper-nickel alloys, and a steel body that is positioned so that it has an interface with the cladding member, the method including the steps of providing the steel body with a formation in which the scavenging metal is located, and is separated from the cladding member at the interface.

From a third aspect, this invention provides method of forming corrosion resistant ferrous product including the steps of providing a billet embodying the first aspect of the invention sealing the billet to prevent gases from outside the billet penetrating to the interface, heating the billet and working the billet to form the ferrous product.

From a fourth aspect, this invention provides a method of forming corrosion resistant ferrous product from a billet comprising a cladding member comprised of an alloy selected from the group comprising stainless steel, nickel-chrome, nickel-copper and copper-nickel alloys, and a steel body that is positioned so that it has an interface with the cladding member, the method including the steps of providing the steel body with a formation in which the scavenging metal is located and is separated from the cladding member at the interface, sealing the billet to prevent gases from outside the billet penetrating to the interface, heating the billet and working the billet to form the ferrous product.

From other aspects, the invention provides a ferrous product produced by a method embodying the invention and by working a billet embodying the invention.

In embodiments of the invention, the steel body is elongate and the formation may be in the form of a cavity that is located in, or adjacent to, an end face of the steel body.

In some embodiments of the invention in which the steel body is elongate, the cavity may be formed in, or adjacent to, an end face of the steel body and being inclined downwards so as to contain by gravity within the steel body any molten scavenging metal is out of contact with the cladding member.

The steel body may be elongate and the cavity may be formed in an end face of the steel body, the scavenging metal being separated from the cladding member at the interface by a portion of the steel body that surrounds the scavenging metal and defines part of the cavity. Alternatively, the cavity may be formed as a recess that opens at an end face of the steel body. The recess may be formed in a portion of the steel body that projects from the cladding, the scavenging metal being within the recess. In such embodiments, passages typically extend from the recess to the interface of the cladding member and the steel body. For instance, an end portion of the cladding member is deformed to overlie an insert that covers the cavity and is located adjacent the end face of the steel body, the insert that covers the cavity being of a metal other than the aforementioned alloy. In one aspect of the invention, the end portion of the cladding member is welded to the insert that covers the cavity. The insert that covers the cavity may be welded to the steel body. The insert that covers the cavity is may be dish shaped. In such examples, the periphery of the insert that covers the cavity may advantageously be closer to the end of the billet adjacent which it is located than the centre of the billet. Alternatively, the periphery of the insert that covers the cavity may be further from to the end of the billet adjacent which it is located than the centre of the billet. The insert that covers the cavity is typically composed of steel.

The steel body may be elongate and the cavity may be formed adjacent an end face of the steel body and in a part of the steel body that has the interface with the cladding member. In scavenging metal and the cladding member, the cavity insert being of a metal other than the aforementioned alloy. Typically, the cavity insert is composed of steel.

Embodiments of the invention will now be described in detail, with reference to the accompanying drawings, all of which are somewhat schematic, and in which:

FIGS. 1 to 5 are side views, in cross section, of one end portion of each of several billets comprising a steel body or core inserted in a stainless steel cladding tube;

FIGS. 1A to 5A are views on Arrows A-A, B-B, C-C in FIGS. 1 to 5 respectively;

FIG. 8 is a side view of one end portion of a billet for forming a tubular end product with an internal cladding of stainless steel;

FIG. 8A is a view on arrows C-C in FIG. 8;

FIG. 9 is a side view, in cross section, of an end portion of a billet for forming a steel plate, one face of which is clad with stainless steel;

FIG. 9A is a plan view of the billet shown in FIG. 9;

FIG. 12 is a side view of one end of a billet embodying the invention intended for manufacture of a partially clad product such as a plate;

FIG. 13 is an end view of the billet shown in FIG. 12;

FIGS. 13 and 13A are side and end views of the plate of FIGS. 12 and 12A with reagent and a closure plug in place.

Figure 4:
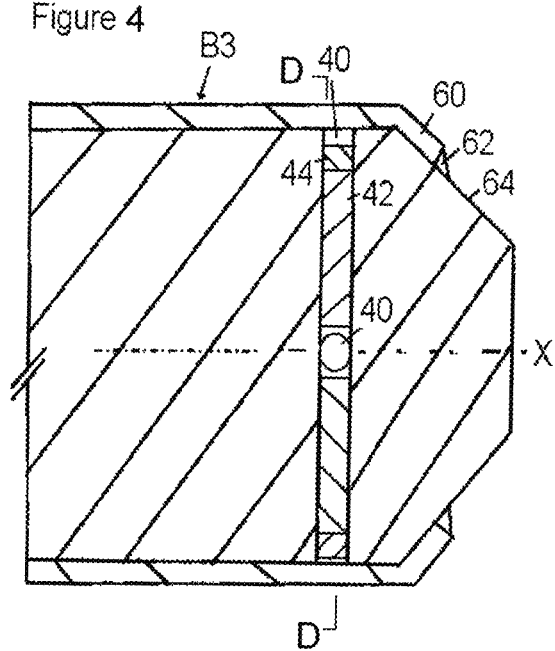
Figure 4:
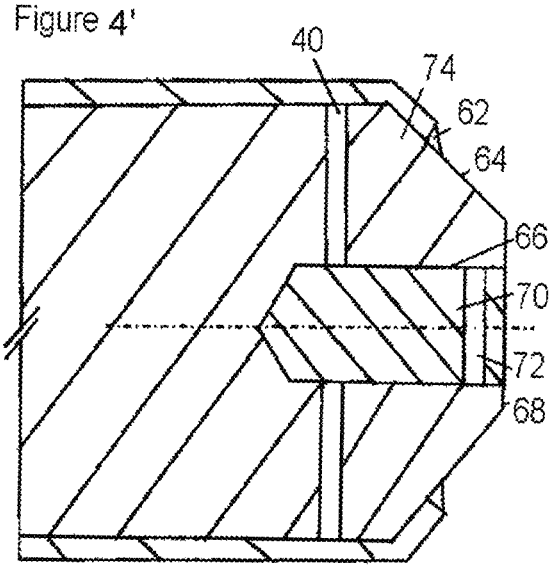

In the description of the examples that follows, the billets are described as having a cladding member comprised of stainless steel. It should be stressed however that the cladding member may be composed of or include any of the alternative alloys contemplated herein since some or all of these alloys are similarly susceptible to the problems of oxidation as described herein.

Referring first to FIGS. 1 and 1A there is shown one end of a billet B1 that comprises a core 14 of solid steel housed in a close fitting cladding member in the form of a tube 16 of stainless steel. The billet is of such size and shape as to be suitable for rolling in a conventional modern rolling mill. For convenience of description, the example described in FIGS. 1 and 1A is a square billet that is suitable to be rolled into a solid finished product. Examples of such products are shown in FIGS. 8a, 8b and 8c which show, respectively, a round bar, a square bar and a flat bar. Each bar comprises a solid steel core C to which is metallurgically bonded an external cladding S of stainless steel. The same billets can also be rolled into sections and other long products.

When the cladding tube 16 is in place, there is an interface 18 between the side faces 20 of the core and the inner faces 22 of the cladding tube. The cladding tube becomes bonded to the core at this interface when the billet is heated and rolled (or otherwise worked) to form a finished product.

The core 14 has an end face 24 which is square to the longitudinal central axis X of the billet. In the simplest form of the billet, the cladding tube terminates short of the end face 24 adjacent portions of the side faces 20 of the core that may conveniently called lands 25. However, before the core is inserted in the cladding tube, a recess 30 is formed in each side face 20 of the core, typically but not essentially by profile cutting with oxy-acetylene or plasma cutters. Each recess 30 spans the face 20 in which it is formed. In this example, the recess is perpendicular to the axis X but could be at any suitable angle. The recesses thus meet at the corners of the core and the four recesses together make up a compound recess 30A that extends completely around the core.

In the example shown in FIG. 2, the arrangement of the billet end is similar to that shown in FIG. 1 except that the core is provided with an additional compound recess 30B that is located between the recess 30A and the end face 24 of the core.

Before the core is inserted in the cladding tube, scavenging metal 33 is placed in the recess 30A, for a purpose that is described below. In the present example, the scavenging metal is titanium (Ti) since Ti does not melt below rolling temperatures. The Ti can advantageously, but not essentially, be in the form of granules that are prepressed into self-supporting briquettes shaped to fit closely in each recess 30. In one alternative, the Ti may be in the form of thin gauge wire that is wound around the billet to partially fill the compound recess 30B. Whatever form the scavenging metal takes, enough space must be left in the recesses 30 to enable a barrier element 34 in the form of a steel strip to be placed over the scavenging metal, sandwiched between the scavenging metal and the cladding tube after the core is inserted in the cladding tube. The strip must fit loosely enough in the recesses to avoid impeding oxidising gases that are initially present or that evolve later, from being drawn to the scavenging metal when the billet is subsequently heated, as will be explained. For this reason, it may be necessary to tack weld or otherwise fix the strip in place. Alternatively, the strip may be perforated. Instead of a strip, steel "wire wool" or any other suitable insert may be used as a barrier element. The barrier element may be comprised of any suitable metal or other material other than stainless steel or any of the metals of which the cladding member can be composed and that does not react with the scavenging metal in the deleterious manner previously described.

The barrier element 34 has the important function of acting as a barrier to keep the scavenging metal out of contact with the cladding tube in order to avoid the previously described destructive reaction between the stainless steel and the scavenging metal when the billet is heated.

In the example shown, the recesses 30 are elliptical in cross section, but this is not essential. They can be rectilinear, semi-cylindrical or of any other suitable shape.

The arrangement of the opposite end of the billet is identical to what has been described with reference to FIGS. 1 to 8.

After the scavenging metal 33 and barrier element 34 have been placed in the recess or recesses, and the steel core has been inserted in the cladding tube, the cladding tube is swaged down incrementally to be in intimate contact with the side faces 20 along the entire length of the core. This swaging procedure is substantially identical to that described in application no. WO2012/143668 and need not be repeated here. In the case of the billet shown in FIG. 1, the tube end 26 is pressed hard up against the lands 25. The end 26 of the cladding tube is then fillet welded 28 to the lands to firmly anchor the cladding tube to the core and to seal the billet against the entry of external gases to the interface 18. The compound recess 30A is positioned at a distance from the end face 24 which is large enough to ensure that the weld 28 has the maximum possible strength.

In the case of the billet shown in FIG. 2, the end 26 of the tube is swaged inwardly into the compound recess 30B where, again, it is welded to the core. The weld 28' is thus also located in the recess 30B. This arrangement considerably reduces the possibility that the sealing weld 28' will fail when the billet is rolled.

Moreover, to further reduce the possibility of weld failure, the core can be tapered at its end as shown in dotted outline at 32. The taper can conveniently also be formed by an oxy-acetylene or plasma cutter at the same time that the recess or recesses are formed. The weld 28, 28' can also be strengthened by pre-applying a stainless steel "butter" weld 38 to the face of the core in the zone at which the weld 28, 28' will be made.

Figure 6:
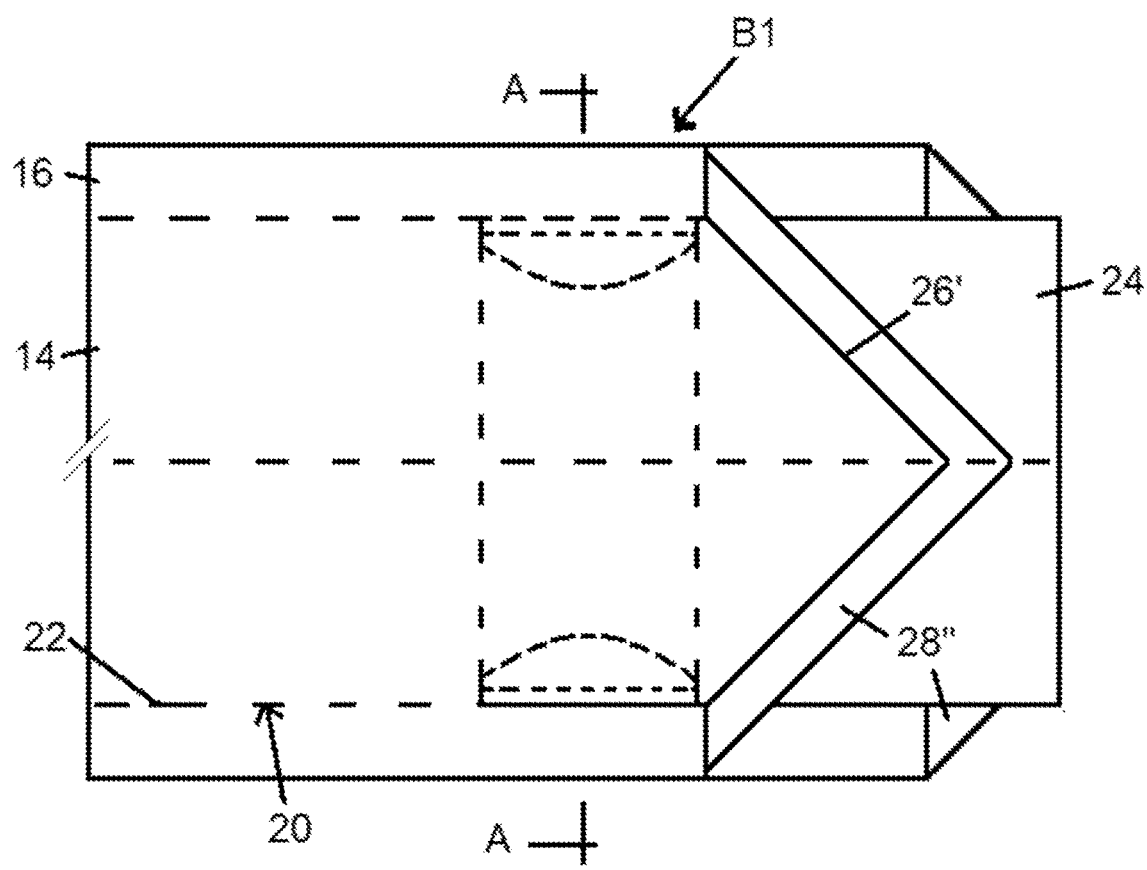
FIG. 6 is a side view of one end portion of a further billet comprising a steel body or core inserted in a stainless steel cladding tube.

In the example shown in FIG. 6, the end of the core is substantially similar to that shown in FIG. 1. However, the end of each side of the cladding tube 16 is cut to the shape of a V as shown at 26'. The tube ends of any billets may, where possible, be angled in this, or any similar manner, and should further reduce the possibility of weld failure.

Figure 7:
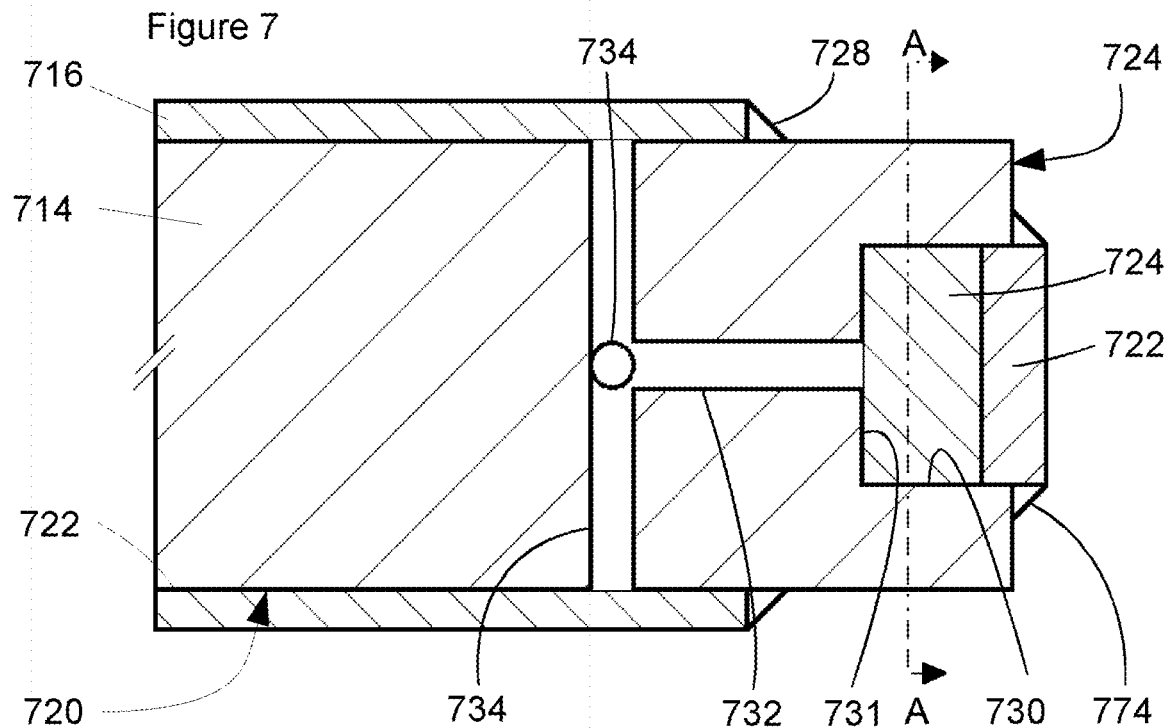
FIG. 7 is a side view, in cross section, of one end portion of yet another, similarly constructed, billet.
Figure 7A:
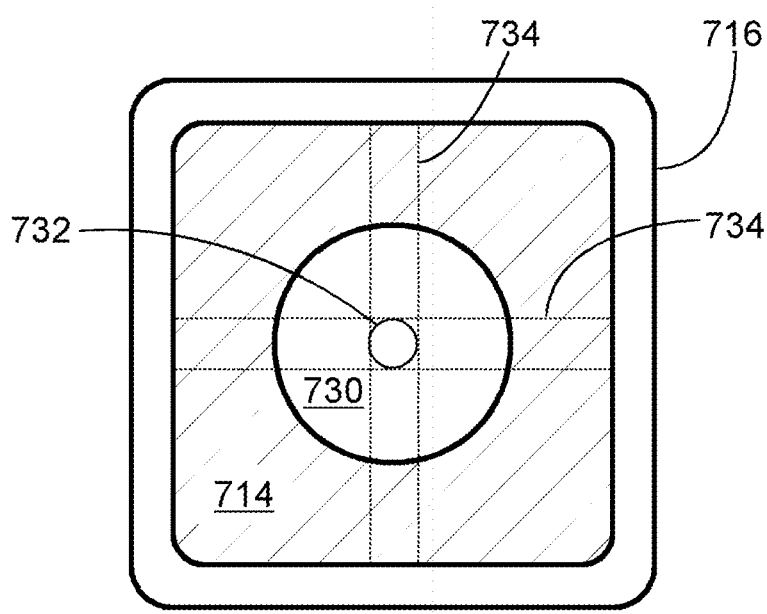
FIG. 7A is a section on A-A in FIG. 7.

Another embodiment is shown in FIG. 7. In this arrangement of an elongate billet, the steel core 714 extends beyond the stainless steel cladding 716 to an end face 724. The cladding 716 is sealed to the core 714 by an annular fillet weld 728. A recess 730 extends from the end face 724 into the core 714. The depth of the recess is such that it extends entirely within a length of the core 714 that projects from the cladding 716. From the recess 730, an axial vent passage 732 extends from an inner base surface 731 of the recess to a position radially inward of the cladding 716. A plurality of cross passages 734 pass transversely through the core 714 from its outer surface 720 (and therefore the interface 722 between the core 714 and the jacket 716), to intersect with the axial vent passage 732. In this embodiment, two cross passages 734 are provided extending through the core 714 at right angles to one another to intersect at the axis of the billet.

A briquette 724 of scavenging metal such as Ti is placed in the recess 730, and the opening of the recess 730 is filled with a sealing plug 772 which is welded in place and sealed with a fillet weld 774. The passages 732, 734 therefore provide gas-tight communication between the briquette 742 and the interface 722.

In the example shown in FIG. 7, the cladding 716 is of generally square cross-section approximately 146 mm square outer dimension and the core 714 is of generally square cross-section approximately 127 mm square outer dimension. The cladding 716 extends to approximately 75 mm from the end surface 730. The passages 734 are approximately 12 mm in diameter. The recess 730 is cylindrical of diameter approximately 63.5 mm. The welding alloy used in trials is a Select Arc 82AP with pre-heating. The alloy composition is an Inconel Filler Metal $ERNiCr_3$ with about 67-74% Ni; 19% Cr; & 2.6% Nb (Niobium). It is therefore heat resistant and should have greater hot strength than a SS welding alloy such as 309 or 312.

In common with other billets exemplified herein, including those shown in FIGS. 1 and 2-7 and 10, essentially the same construction could be used in a billet of circular or other cross-section and of smaller or larger size.

Figure 14A:
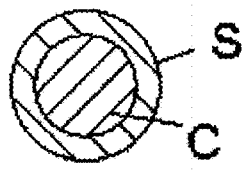
FIGS. 14A-14G are cross sectionals view of end products produced by working the various billets illustrated in the drawings.
Figure 14B:
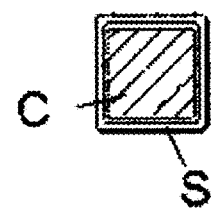
Figure 14C:
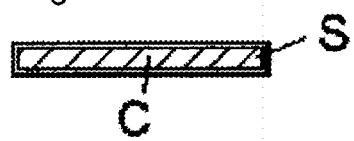

Although the welds in the examples shown herein are described as fillet welds, any other form of welding, such as resistance welding, may be used It will be clear to the instructed reader that, as shown in FIG. 2A, a round billet 1C has a single recess 30C that performs the functions of the compound recess 30A. The recess 30C is formed by machining or any other suitable method. The billet 1C can also be rolled into a solid finished product such as is shown in FIGS. 14A to 14C.

Figure 14D:
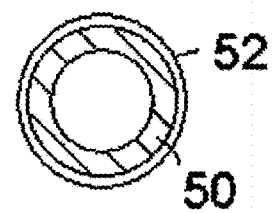
Figure 14E:
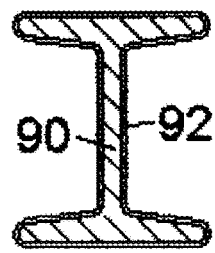

The core of each of the billets shown in FIGS. 1-3 and 6 may be provided with an axially extending passage shown, for example, in dotted outline at 36, coincident with the axis X of the core. This passage may be required for working the billets into pipes or other finished tubular products having an external cladding of stainless steel. An example of such a finished pipe is shown in FIG. 14D and comprises a tubular interior steel portion 50 to which a stainless steel outer cladding 52 is metallurgically bonded. The techniques and equipment for this purpose are substantially the same as those for working conventional (unclad) billets into pipes. They are well known and need not be described here.

The billet is now ready to be heated and worked into a finished product. WO2011/048364 contains a detailed description of these procedures, which need not be repeated here in detail. It is sufficient to note that the ends of the billet are initially heated to cause the titanium in the briquettes to become active to scavenge residual oxygen and other gases in the billet apart from the inert gases before the stainless steel at the interface 18 reaches a temperature at which oxidation of the chrome in the cladding tube takes place on a significant scale. These other gases include nitrogen, hydrogen, carbon dioxide and carbon monoxide. They are drawn from the interface past the barrier element 34 into the recess 30A where they are absorbed as oxides, nitrides, hydrides and carbides by the titanium. Titanium is certainly active at 600° C. to achieve this goal but it is now believed that it may be sufficiently active even at about 250° C. to start this scavenging process.

It has been found in some cases sufficient simply to place the billet in a conventional heating furnace in order to activate the titanium as described. The reasons for this are not fully understood. As long as the cladding tube is cool, it remains in intimate contact with the core due to the swaging operation previously described. Also, the massive steel core acts as a heat sink which initially tends to keep the cladding tube relatively cool when the billet is placed in the furnace. Furthermore, the furnace heat should be transferred rapidly to the titanium if the titanium is placed in a cavity or passage formed in the end of the core such as described below with reference to FIGS. 4', 7-7A and 10-12. In this construction, the plate which seals the passage is typically of carbon steel and, being relatively thin, transfers the furnace heat rapidly to the titanium, since carbon steel conducts heat much more rapidly than stainless steel.

However, if the step just described proves unsatisfactory the billet ends can be preheated before the billet is placed in the furnace. Techniques for carrying out this preheating are described in WO2011/048364.

Each of the billets shown in FIGS. 3 to 5 and 8 is similar to the billets already described in comprising a steel body and a cladding member of stainless steel. However, different cavities are used to accommodate the scavenging metal in the cores of these billets. In all of these billets, the compound recess previously described is replaced by passages 40 that are drilled, or otherwise formed, in the face of the steel body that has the interface with the cladding member. A preformed briquette 42 of Ti is placed in each passage 40 followed by a barrier element 44 inserted between the Ti and the cladding member. In each case, the barrier element 44 comprises a thin steel plate, possibly perforated, or a plug of steel wire wool. The Ti and the barrier elements 44 serve the purpose and function as the Ti and barrier elements 34 already described.

In FIGS. 3-4', the billet B2 is also square, comprising a core 14a inserted in, and welded 28a to, a cladding tube 16a. This billet is suitable for producing products of the same type as shown and previously described with reference to FIGS. 14A to 14C.

In the billet 133 shown in FIG. 4, the ends of the cladding tube 60 are swaged to taper inwardly, and welded 62 to the tapered end 64 of the core. The passages 40, which have previously been drilled right through the steel body from one face 18 to the other, intersect at the centre of the core. The Ti briquettes 42 are placed in each passage and the steel barrier elements 44 are inserted in the passages between the Ti and the cladding tube.

FIG. 4A shows a modification of the billet B3, in which the passages 40 are of substantially smaller diameter. An axially extending passage 66 is drilled into the end face 68 of the core. Ti briquettes 70 are placed in this passage 66 rather than in the passages 40 and a solid carbon steel sealing plate 72 is welded to the core in the outer end of the passage 66. Since, in this embodiment, the Ti is separated from the cladding plate by the portion 74 of the core that surrounds the passage 66, it may be unnecessary to insert barrier elements 44 in the passages 40. The passages therefore act merely to allow gases that are initially present or that evolve in the billet, other than inert gases, to be drawn to the Ti.

Figure 11:
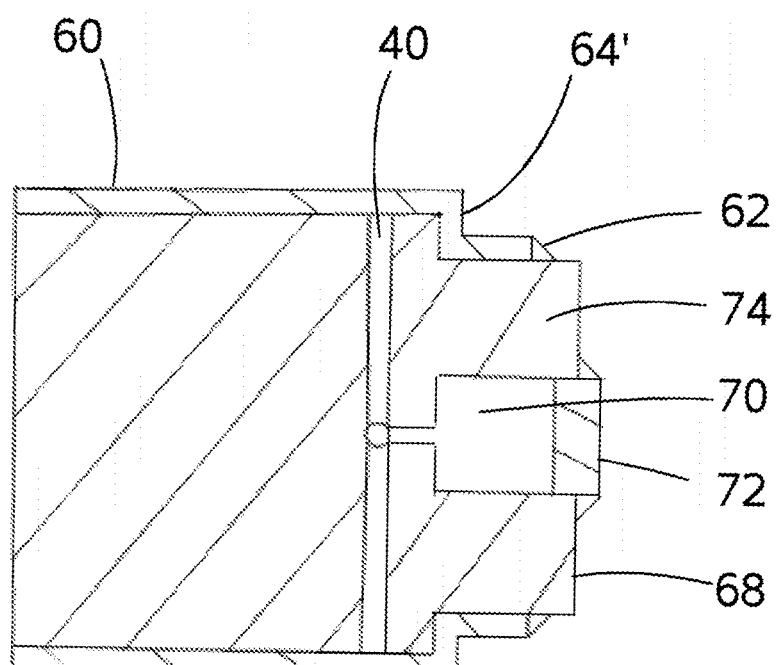
FIG. 11 is a side view, in cross section, of one end of a billet being a variation of the billet of FIGS. 4 and 4A

In a modification to this billet, shown in FIG. 11, the ends 64' of the cladding tube 60 are swaged to step inwardly. Squeezing the cladding tube onto a straight surface rather than a tapered surface may produce a tidier result and be easier to achieve.

Figure 5A:
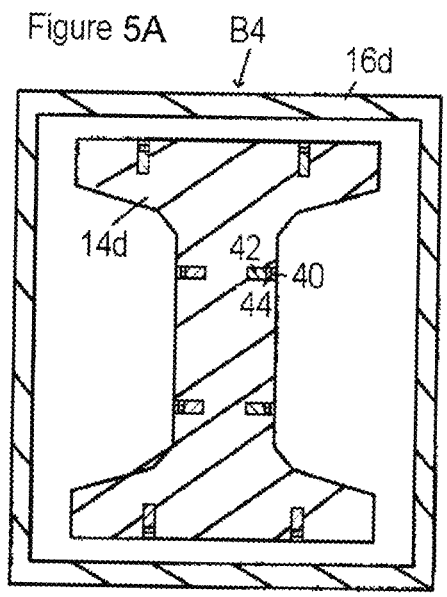
Figure 5:
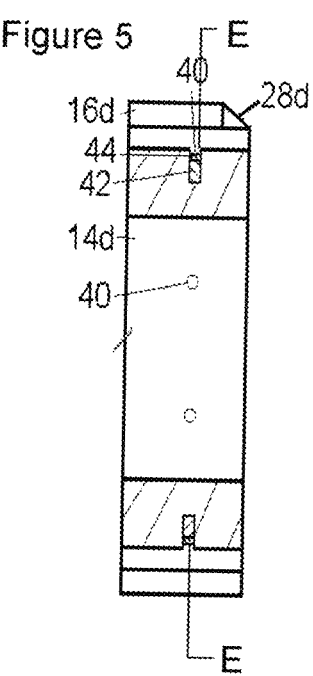

In FIGS. 5 and 5A, the billet B4 comprises a core 14d of so-called "near net shape" inserted in, and welded 28d to, a cladding tube 16d which is initially square (as shown in FIG. 5A) but is swaged down to take up the shape of the core 14d after the core is inserted in the tube. The billet B4 is suitable to be rolled into an I-beam such as shown in FIG. 8e having a core 90 with a cladding 92 of stainless steel.

Figure 14F:
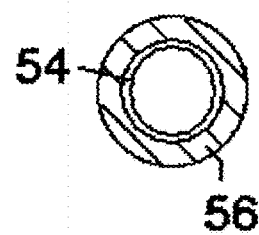

In FIG. 8, the billet B5 is intended to be worked into a tubular pipe or similar product such as the pipe shown in FIG. 14F, comprising a tubular exterior steel portion 54 to which a stainless steel inner cladding 56 is metallurgically bonded. Accordingly, the billet B5 comprises a pierced or hollow steel billet 14e that is provided with a passage 36' that is disposed along the central axis X of the billet. A stainless steel tube 16e is inserted in this passage and lightly outwardly swaged into contact with the passage 36' before being welded 28e to the billet. As previously noted, the techniques and equipment for producing such internally clad pipes are substantially the same as those for working conventional (unclad) billets into pipes. They are well known and need not be described here.

Figure 14G:
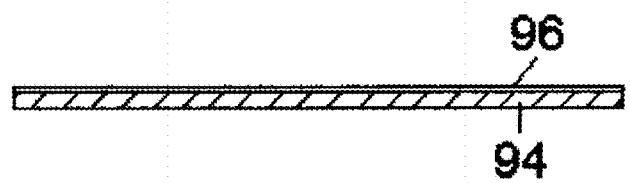

In FIG. 9, the billet B6 is intended to be worked into a steel plate 94 with a stainless steel cladding 96 shown in FIG. 14G. The billet B6 comprises a cast or rolled steel slab 14f against which is placed a stainless steel cladding plate 16f. The plate 16f is welded 28f to the slab 14f around the complete periphery of the latter. Again, the techniques and equipment for producing such clad plates are substantially the same as those for working conventional (unclad) plates. They are known and need not be described here. It should be noted that the passages 40 in the slab 14f would masked by the plate 16f and would thus not in reality be visible in the plan view of FIG. 9A. FIG. 9A is intended to show the position of the passages 40 about the periphery of the slab 14f.

An alternative billet for a slab product is shown in FIGS. 12 and 13. This can be considered to be a modification of the billet of FIGS. 9 and 9A, with which it shares features other than will be described. The billet comprises a core 814 and a metallurgically bonded cladding layer 816. In this embodiment, the reagent briquette 842 is located in a bore 844 that opens to an outer side surface 846 of the slab 814. The bore 844 is connected to the interface surface by a passage 840 that intersects with the bore at right angles to it. The bore is closed by a welded plug 848 after the briquette is inserted into it.

Although the passages 40 are shown in the examples as being generally in alignment about the periphery of the core and generally perpendicular to the faces of the cores, this is not essential. Placing the passages out of alignment or in other orientations may, for example, reduce warpage or failure of the billet during rolling.

Figure 10:
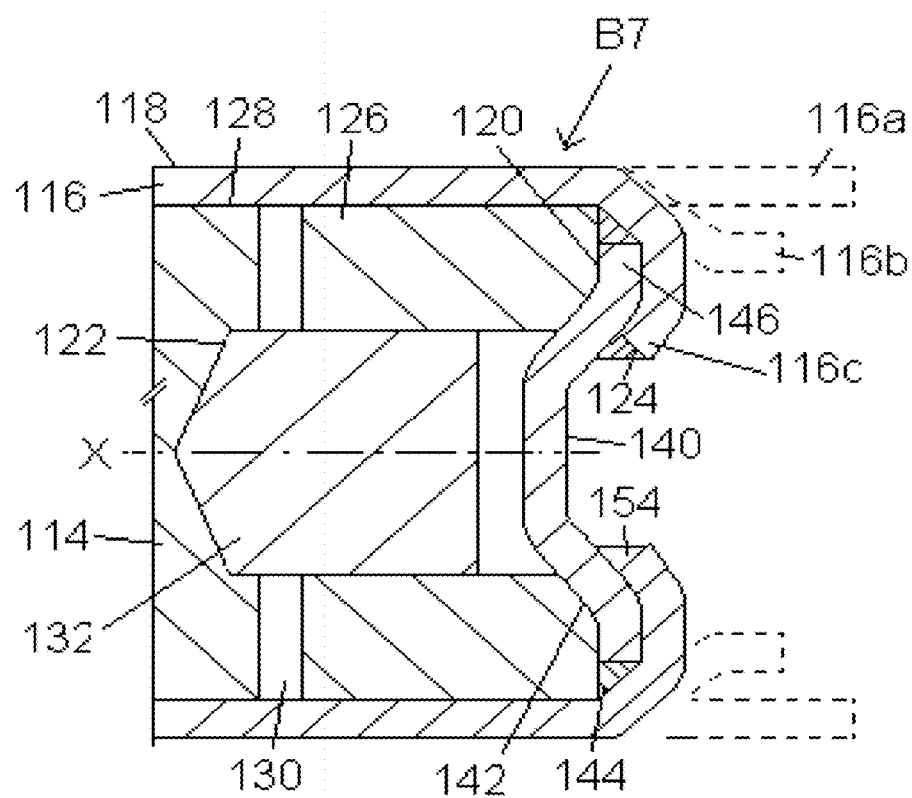
FIG. 10 is a side view, in cross section, of one end of a billet comprising a steel core inserted in a stainless steel cladding tube in, respectively, a partially and fully closed state.

Referring now to FIG. 10, there is shown one end of yet another billet B7 that comprises a core 114 of solid steel housed in a cladding tube 116 of stainless steel. This billet B7 has similar characteristics to the billet B1 and may thus be of round or square cross sectional shape. By way of example only, after swaging, the billets B1 and B7 may be square with sides nominally of 146 mm wide and may be up to about 12 m long. The cladding tube may have a wall thickness of about 9.52 mm, the nominal size of each side face of the core thus being 127 mm.

The core 114 has an end face 120 which is square to the longitudinal central axis X of the core. Before the core is inserted in the cladding tube, a cavity 122, in this example of diameter 63.5 mm and centred on the axis X, is formed in the end face, typically but not essentially by drilling. A pronounced chamfer 124 is formed in the remaining portion 126 of the core that surrounds the cavity. Furthermore, a smaller hole, for example of 9.52 mm diameter, is drilled through the portion 126 from the longitudinal centre line of each side face 128 of the core to form a passage 130 that connects the cavity 122 to the side face 128.

At this stage, a quantity of Ti turnings, pre-compacted into a briquette 132, is inserted in the cavity 122. A dish-shaped steel plate 140 is pressed up against, and interval welded 144 along its periphery 146 to, the end face 120 of the core. The shape of the plate 140 is such that the face 142 of its dished portion is a snug fit against the chamfer 124.

The opposite end of the billet is then processed in similar fashion, as will now be described with reference to FIG. 10A. The cavity 122 is formed in the end face 120. A briquette 132 of titanium turnings is placed in the cavity 122, being separated from the interface 128 by the portion 126 of the core that surrounds the cavity 122. Four passages 130 are formed in this portion 126 and it is also chamfered as indicated at 124.

A dish-shaped steel plate 160 is now pressed up against the end face 120 of the core. The shape and orientation of the plate 160 differs from that of the plate 140. The plate 160 has a peripheral flange 162 that arises from the central base portion 164 and is chamfered as shown at 166. The plate 160 is orientated so that the flange 162 projects towards the core. With the plate in position, the edge 170 of the flange is butted up against the end face 120 of the core and there is a considerable void space 176 between the briquette 132 and the base 164. The plate 160 is now interval welded 174 along the chamfer 166 to the end face 120.

In this condition, the core 114 is inserted in the cladding tube 116. As indicated in dotted outline at 116a, 116a' the ends of the cladding tube initially overlap each of the end faces 120 of the core. The cladding tube is now advantageously swaged into intimate contact with the core along the interface 128, as described in detail in WO2012/143668. In this procedure, as indicated at 116b, 116b', the tube end portions are inwardly swaged to a size of, for example 89 mm, that is smaller than that of the core 114. The billet is then taken to a press where the end portions 116b, 116b' are pressed so that they are wrapped around, and hard up against, the plates 140, 160 respectively as shown at 116c in FIGS. 10 and 116c' in FIG. 10A. In this condition, the edges of the tube end portions are welded to the plates 140, 160 as indicated at 154, 178 respectively.

For the reasons already discussed, the titanium in the cavities 122, 122' is separated from the interface 118 by the plates 140, 160 and the portions 126 of the core that surround the cavities.

The plates 140, 160 hold the briquettes 132 in the cavities, effectively preventing any possibility of contact between the titanium and the end portions of the cladding tube after the latter have been wrapped around the plates 140, 160. The plates 140, 160 also provide extra support against stresses that are applied to the welds 154, 178 during rolling.

It may be noted that the ends of the cladding tube do not need to be cut in order to effect the above described wrapping procedure. In trials to date, longitudinally extending cuts have been made in the tube ends of some billets to facilitate folding the tube ends over the end faces of the cores. In such cases, it is necessary to weld the edges of the cut portions together after folding. While such welding is not outside the intended ambit of the present invention, it is expensive and is a potential source of weakness in the ends of the billets.

The billet B7 can be heated and rolled into finished products, using the same techniques as used for billet B1. Clearly, products of other suitable shapes and sizes could be produced by the processes and from the billets disclosed herein.

As explained in detail in both WO2011/048364 and WO2012/143668, other scavenging metals, including in particular aluminium and magnesium, may in principal be used instead of titanium. Furthermore any of these metals may be used alone or in combination and in a suitable form other than briquettes. However, both magnesium and aluminium melt below the temperature at which the billet is rolled so steps must be taken to prevent the molten metal from coming into contact with the cladding tube. One such possible technique would be to form one or more cavities only in an upper face of the core, such as, for example, the cavities 40' in FIGS. 3 and 3A. The scavenging metal would be placed in these cavities and, when molten, would be retained in these cavities by gravity. Spillage of the molten metal could be prevented by barrier elements 44 of the type previously described. Alternatively, the scavenging metal could be housed in a steel canister which is placed in the cavity. Only the top of the canister would be open. In both of these cases, to avoid spillage, it would be necessary to ensure that the billet is not turned over in the furnace or in the early stages of rolling, before the cladding member becomes properly bonded to the core.

Figure 10A:
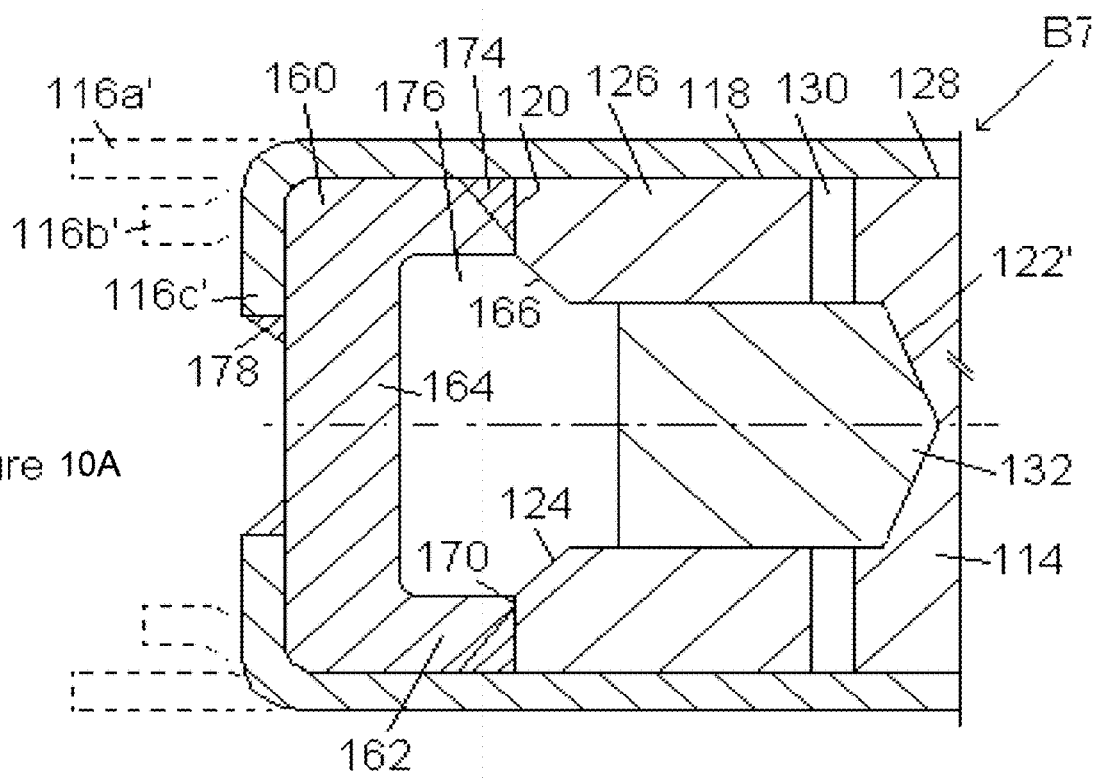
FIG. 10A is a similar view of the opposite end of the billet shown in FIG. 10.

The arrangement shown in FIGS. 10 and 10A has been developed for a billet that is rolled in an in-line rolling mill and is intended to reduce the probability of failure of the end welds at the trailing end of the billet due to the differential elongation of the core metal during rolling, as mentioned above. Core metal elongated in this way drives the briquette 132 before it. The briquette enters the void space 176 provided by the plate 160 in the trailing end of the billet. In the example under discussion, the void space is 50.8 mm wide which, it is thought, is sufficient to accommodate such extrusion in most cases. Even if the briquette is eventually driven into contact with the base 164 of the plate 160, the force is thereof is distributed to the core 126 through the welds 174 rather than wholly to the weld 178. Further, this contact likely to occur at a late stage in the rolling, after the core and the cladding tube have become fully bonded together. In this event, there is a much diminished possibility of failure of the billet end.

Conversely, the leading end of the core becomes convex when the billet is rolled through an in line mill, the central portion receding inwards relative to the perimeter of the core and the cladding tube. The weld 154 is drawn radially inwards and eventually becoming an internal, not external, part of the billet being rolled.

The invention claimed is:

1. A billet comprising:
   a cladding member comprised of an alloy selected from the group consisting of: stainless steel, nickel-chrome, nickel-copper and copper-nickel alloys, and
   a carbon steel body that is positioned so that it has an interface with the cladding member,
   wherein a part of the steel body that has the interface with the cladding member comprises:
   a formation selected from a cavity, a passage, a bore and a recess in which scavenging metal that serves to scavenge oxygen and all other gases except inert gases from residual air at the interface is located and
   a barrier that separates the scavenging metal from the cladding member at the interface, and
   a sealing weld that seals the billet.

2. The billet according to claim 1, wherein the steel body is elongate.

3. A billet according to claim 1, wherein the formation is in the form of a cavity that is located in, or adjacent to, an end face of the steel body.

4. The billet according to claim 3, wherein the barrier is formed by a portion of the steel body that surrounds the scavenging metal and defines at least a part of the cavity.

5. The billet according to claim 3, wherein an end portion of the cladding member is deformed to overlie an insert that covers the cavity and is located adjacent the end face of the steel body, wherein the insert forms at least part of the barrier.

6. The billet according to claim 5, wherein the insert that covers the cavity is dish shaped.

7. The billet according to claim 5, wherein the periphery of the insert that covers the cavity is closer to the end of the billet adjacent which it is located than the centre of the billet.

8. The billet according to claim 5, wherein the periphery of the insert that covers the cavity is further from the end of the billet adjacent which it is located than the centre of the billet.

9. The billet according to claim 5, wherein the insert that covers the cavity is composed of steel.

10. The billet according to claim 1, wherein the cavity is oriented in such a way that any molten scavenging metal located in the cavity is contained by gravity within the steel body and any molten scavenging metal is out of contact with the cladding member.

11. The billet according to claim 1, wherein the formation includes a recess that opens at an end face of the steel body.

12. The billet according to claim 11, wherein the recess is located in a portion of the steel body that projects from the cladding, the scavenging metal being located within the formation.

13. The billet according to claim 11, further comprising passages that extend from the recess to the interface of the cladding member and the steel body.

14. The billet according to claim 11 having an insert located in the formation between the scavenging metal and the cladding member, the insert being of a metal other than the alloy of the cladding member, wherein the insert forms at least part of the barrier.

15. The billet according to claim 14, wherein the insert is composed of steel.

16. A method of forming a billet comprising:
    a cladding member comprised of an alloy selected from the group consisting of: stainless steel, nickel-chrome, nickel-copper and copper-nickel alloys, and a carbon steel body that is positioned so that it has an interface with the cladding member,
    the method comprising:
    forming in the steel body a formation selected from a cavity, a passage, a bore and a recess, providing a barrier member,
    inserting scavenging metal that serves to scavenge oxygen and all other gases except inert gases from residual air at the interface in the formation such that it is separated from the cladding member at the interface by the barrier member, and
    forming a sealing weld that seals the billet.

17. A method of forming corrosion resistant ferrous product, the method comprising:
    providing a billet comprising a cladding member comprised of an alloy selected from the group consisting of: stainless steel, nickel-chrome, nickel-copper and copper-nickel alloys, and a carbon steel body that is positioned so that it has an interface with the cladding member, wherein a part of the steel body that has the interface with the cladding member has a formation selected from a cavity, a passage, a bore and a recess in which scavenging metal that serves to scavenge oxygen and all other gases except inert gases from residual air at the interface is located and a barrier being provided that separates the scavenging metal from the cladding member at the interface, and a sealing weld that seals the billet; and
    heating the billet and working the billet to form a corrosion resistant ferrous product.

* * * * *